(12) United States Patent
Kim et al.

(10) Patent No.: US 8,711,983 B2
(45) Date of Patent: Apr. 29, 2014

(54) PHASE LOCKING LOOP

(75) Inventors: Taejoon Kim, Berkeley, CA (US);
Timothy M. Schmidl, Dallas, TX (US);
Srinath Hosur, Plano, TX (US)

(73) Assignee: Texas Instruments Incorporated,
Dallas, TX (US)

( * ) Notice: Subject to any disclaimer, the term of this patent is extended or adjusted under 35 U.S.C. 154(b) by 322 days.

(21) Appl. No.: 13/284,716

(22) Filed: Oct. 28, 2011

(65) Prior Publication Data

US 2012/0106611 A1 May 3, 2012

Related U.S. Application Data

(60) Provisional application No. 61/407,967, filed on Oct. 29, 2010.

(51) Int. Cl.
*H03D 3/18* (2006.01)
*H03D 3/24* (2006.01)

(52) U.S. Cl.
USPC ........... 375/327; 375/130; 375/240; 375/259; 375/376

(58) Field of Classification Search
USPC .......... 370/206, 477; 375/130, 240, 259, 316, 375/327, 373, 376
See application file for complete search history.

(56) References Cited

U.S. PATENT DOCUMENTS

| | | | | |
|---|---|---|---|---|
| 4,954,788 A * | 9/1990 | Leis et al. | ........... | 331/16 |
| 5,121,085 A * | 6/1992 | Brown | ........... | 331/8 |
| 5,828,954 A * | 10/1998 | Wang | ........... | 455/260 |
| 6,307,696 B1 * | 10/2001 | Bishop et al. | ........... | 360/51 |
| 6,590,950 B1 * | 7/2003 | Mycynek | ........... | 375/376 |
| 6,696,886 B1 * | 2/2004 | Ke et al. | ........... | 327/553 |
| 7,323,944 B2 * | 1/2008 | Florescu et al. | ........... | 331/14 |
| 8,139,704 B2 * | 3/2012 | Heinrich | ........... | 375/376 |
| 8,483,985 B2 * | 7/2013 | Stockstad et al. | ........... | 702/85 |
| 2004/0101068 A1 * | 5/2004 | Wang et al. | ........... | 375/324 |
| 2006/0290435 A1 * | 12/2006 | Staszewski et al. | ........... | 331/16 |
| 2008/0123788 A1 * | 5/2008 | Wongwirawat et al. | ........... | 375/348 |
| 2009/0284297 A1 * | 11/2009 | Ebuchi | ........... | 327/291 |
| 2010/0020911 A1 * | 1/2010 | Heinrich | ........... | 375/376 |
| 2010/0067634 A1 * | 3/2010 | Furman et al. | ........... | 375/376 |
| 2011/0080199 A1 * | 4/2011 | Yen et al. | ........... | 327/157 |
| 2012/0192238 A1 * | 7/2012 | Crookes et al. | ........... | 725/64 |

\* cited by examiner

*Primary Examiner* — Jean B Corrielus
(74) *Attorney, Agent, or Firm* — John R. Pessetto; Wade J. Brady, III; Frederick J. Telecky, Jr.

(57) ABSTRACT

A phase-locking loop (PLL) for use with orthogonal frequency division multiplexed signals. In one embodiment, a wireless receiver includes a PLL is configured to reduce phase and frequency divergence between the wireless receiver and a transmitter of a packet received by the wireless receiver. The PLL includes a loop bandwidth controller. The loop bandwidth controller is configured to set a bandwidth of the PLL to a first value for reception of an initial symbol of the packet. The loop bandwidth controller is configured to reduce the bandwidth of the PLL over a number of symbols preceding an initial header of the packet.

19 Claims, 6 Drawing Sheets

PHASE LOCKING LOOP

CROSS-REFERENCE TO RELATED APPLICATION

The present application claims priority to U.S. Provisional Patent Application No. 61/407,967, filed on Oct. 29, 2010; which is hereby incorporated herein by reference in its entirety.

BACKGROUND

Wireless personal area networks (WPANs) are used to convey information over relatively short distances. A WPAN may transfer data at a relatively low rate to minimize power consumption. Unlike wireless local area networks (WLANs), WPANs employ little or no infrastructure. Consequently, WPANS allow small, power-efficient, and inexpensive solutions to be implemented for a wide range of devices.

Smart Utility Networks (SUNs) are one application of WPAN technology. A SUN may operate either over short ranges such as in a mesh network where utility meter information is sent from one utility meter to another, or over longer ranges such as in a star topology where utility meter information is sent to a pole-top collection point. The terms WPAN and SUN are used interchangeably herein.

Devices that communicate via a WPAN, or other type of wireless network, include oscillators that determine the carrier frequencies of the network. The frequencies of the oscillators drift over time. The drift can cause frequency and/or phase errors between the oscillators of communicating wireless devices. Such errors can cause errors in symbol decoding due to rotation of the symbol constellation in the receiving device. Some wireless devices may include a phase-locking loop to lock the receiver frequency to the carrier frequency of a transmission.

SUMMARY

A phase-locking loop (PLL) for use with orthogonal frequency division multiplexed signals. In one embodiment, a wireless receiver includes a PLL configured to reduce phase and frequency divergence between the wireless receiver and a transmitter of a packet received by the wireless receiver. The PLL includes a loop bandwidth controller. The loop bandwidth controller is configured to set a bandwidth of the PLL to a first value for reception of an initial symbol of the packet. The loop bandwidth controller is configured to reduce the bandwidth of the PLL over a number of symbols preceding an initial header of the packet.

In another embodiment, a method includes initializing a PLL of a wireless receiver to operate with a first bandwidth for reception of a wirelessly transmitted orthogonal frequency multiplexed packet. The bandwidth of the PLL is reduced from the first bandwidth to a second bandwidth as symbols preceding an initial header of the packet are received. The first bandwidth provides fast carrier acquisition, and the second bandwidth provides lower phase noise than the first bandwidth.

In a further embodiment, a system includes a first wireless device. The first wireless device is configured to receive a wirelessly transmitted orthogonal frequency multiplexed packet including frequency domain spreading. The first wireless device includes a PLL configured to lock the first wireless device to a carrier frequency of the packet. The PLL includes a despreader and a power loop. The despreader is configured to despread, prior to phase estimation, header and data signals of the packet. The despreading is in accordance with a frequency domain spreading factor applied to the packet at transmission. The power loop is coupled to an output of the despreader. The power loop is configured to extract phase offset from a despread data signal by computing a fraction of the data signal raised to a power. The fraction and the power are determined based on a type of modulation applied to the packet at transmission.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A utility network or smart utility network (SUN) is a low-rate (e.g., 40 kbps to 1 Mbps) low-power wireless personal area network (WPAN) that is specifically designed for use in utility metering applications such as transmitting electric, gas, water usage, and other like data from the customer premises to a data collection point operated by the utility. For example, utility meters are installed for each house in a residential neighborhood, and the usage data is sent periodically from each utility meter to a data collection point, which is an element of the SUN. The data collection point is connected by fiber, copper wire, or wireless connection to a central office that collects all the usage data for a region. Usage data is sent either directly from each utility meter to the collection point or from utility meter to utility meter until the collection point is reached in a star or mesh network formation, respectively.

Orthogonal frequency division multiplexing (OFDM) spreads a data stream across a large number of orthogonal sub-carriers. The sub-carriers allow for reduced modulation rates and can enhance signal reliability in multipath environments. OFDM is used in a variety of wireless communication systems, including SUNs. Unfortunately, frequency and/or phase errors between the oscillators of wireless devices communicating via OFDM can disrupt demodulation by perturbing the orthogonality of the sub-carriers.

Embodiments of the present disclosure include a phase-locking loop (PLL) that tracks phase offset existing in symbols of OFDM systems. Note that the term symbol can refer to the OFDM symbol and also to the PSK symbol carried on each subcarrier. The PLL locks the phase rotation of the symbol induced by residual carrier frequency offset in the frequency domain. Embodiments of the PLL use the long training field, scattered pilots, and data symbols of a received packet to generate phase error estimates. Consequently, embodiments of the PLL can operate at a very low signal-to-noise ratio (SNR). For example, embodiments are operable at the low SNR encountered when frequency domain spreading is applied in conjunction with OFDM.

Figure 1:
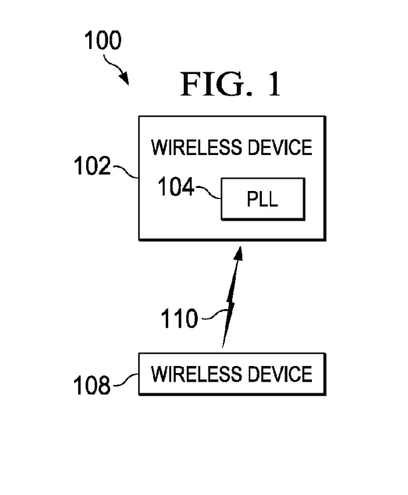
FIG. 1 shows a block diagram of wireless network including a wireless device incorporating a phase-locking loop (PLL) in accordance with various embodiments.

FIG. 1 shows a block diagram of a wireless system including a wireless device incorporating a PLL in accordance with various embodiments. The system 100 includes wireless devices 102 and 108. The wireless devices 102 and 108 are configured to transmit and/or receive OFDM signals. The wireless devices 102, 108 may apply frequency domain spreading (FDS) to the OFDM signals. Though only two wireless devices 102, 108 are shown, in practice the system 100 may include any number of wireless devices. In some embodiments, the wireless devices 102, 108 may be SUN devices in accordance with the IEEE 802.15.4 standard.

The wireless device 108 transmits the signal 110 for reception by the wireless device 102. The wireless device 108 generates the frequencies of the signal 110 in accordance with a frequency and phase of an oscillator of the wireless device 108. A packet included in the signal 110 includes a preamble, a header, and a data payload. The preamble may include training fields (e.g., long and/or short training fields). The header may be modulated using binary phase shift keying (BPSK) or quadrature phase shift keying (QPSK). The data payload may be modulated using BPSK, QPSK, or 16-state quadrature amplitude modulation. (16-QAM). Information encoded in the header defines the data rate, modulation, frequency spreading factor, and length of the data payload. Pilots are embedded in the header and data payload to enable the PLL of the wireless device 102 to track the phase offset of the signal 110 in the frequency domain. The positions of the pilots in the header and/or data may change from symbol to symbol.

The wireless device 102 receives the signal 110. In order to facilitate proper decoding of the symbols encoded in the signal 110, the wireless device 102 includes the PLL 104. The type of modulation and the frequency spreading factor applied to the header of the transmitted packet are known to the receiving wireless device 102 a priori. The PLL 104 estimates the phase and/or frequency error between an oscillator of the wireless device 102 and the oscillator of the wireless device 108 based on the data, pilot, and training symbols encoded in the signal 110. The PLL 104 adjusts the frequency of the oscillator of the wireless device 102 based on the estimated phase and/or frequency error.

The PLL 104 utilizes both the pilot tones and the data tones of the OFDM signal 110 to track phase offset. Consequently, the PLL 104 is applicable to embodiments of the OFDM system 100 that embed pilots in the header and data payload and to embodiments of the OFDM system 100 that lack pilots in the header and data payload. The PLL 104 is also capable of tracking phase offset when the pilots shift position with each OFDM symbol to different subcarriers.

Figure 2:
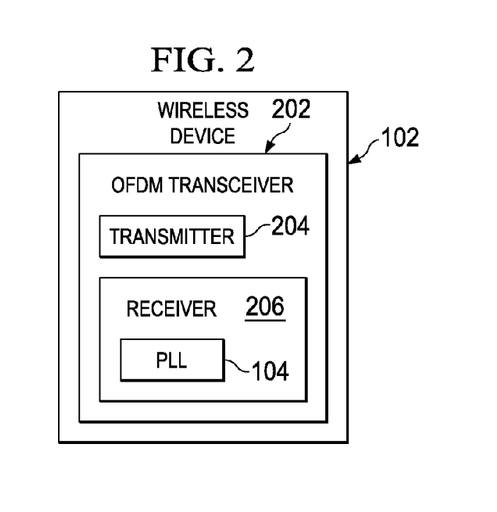
FIG. 2 shows a block diagram of wireless device including a receiver with a PLL in accordance with various embodiments.

FIG. 2 shows a block diagram of the wireless device 102 in accordance with various embodiments. The wireless device 102 includes an OFDM transceiver 202 for wirelessly transmitting and/or receiving OFDM signals. The OFDM transceiver 202 includes an OFDM transmitter 204 and an OFDM receiver 206. The OFDM transmitter 204 includes components for transmitting an OFDM signal, such as amplifiers, D/A converters, filters, a cyclic prefix generator, an inverse Fourier transformer, pilot tone generators, preamble generators, encoders, modulators, etc.

The OFDM receiver 206 includes components for receiving a wirelessly transmitted OFDM signal, such as amplifiers, filters, digitizers, oscillators, a Fourier transformer, demodulators, decoders, symbol detectors, etc. The receiver 206 also includes the PLL 104. The PLL 104 adjusts the frequency and/or phase of an oscillator in accordance with the frequency and/or phase of the received signal 110.

Figure 3:
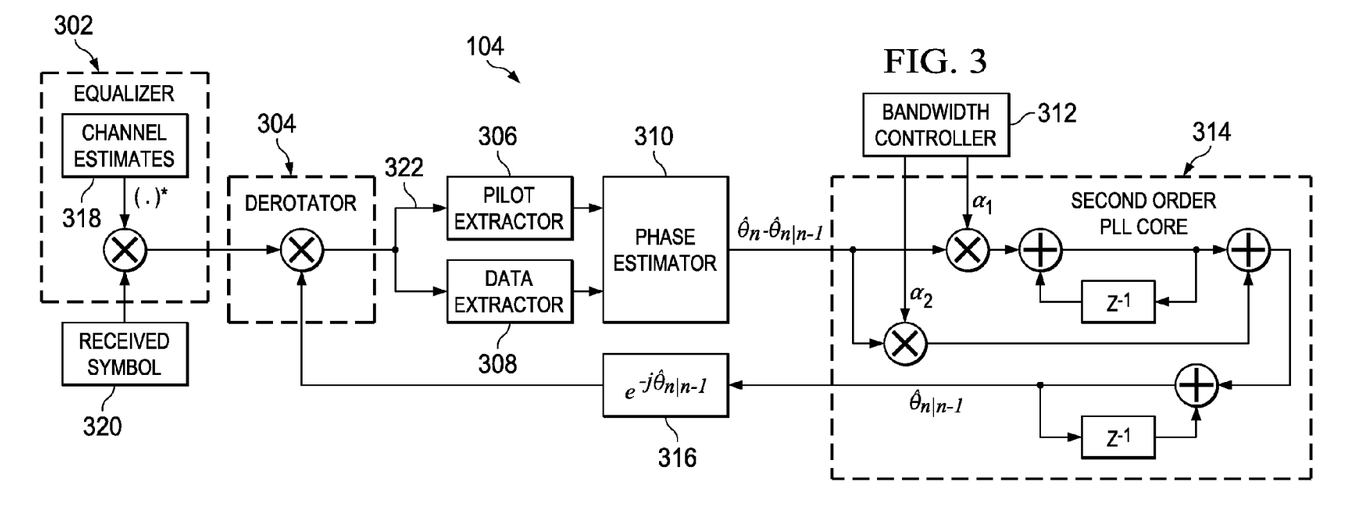
FIG. 3 shows a block diagram of a PLL in accordance with various embodiments.

FIG. 3 shows a block diagram of the PLL 104 in accordance with various embodiments. The PLL 104 includes an equalizer 302, a derotator 304, a pilot tone extractor 306, a data tone extractor 308, a phase estimator 310, a bandwidth controller 312, and a second-order PLL core 314 including filters for the PLL 104. An output of the PLL core 314 adjusts the frequency and phase of the oscillator 316.

The equalizer 302 applies channel estimates 318 to equalize a symbol 320 encoded in the received signal 110. The equalizer 302 may be a minimum mean square error equalizer or other equalizer for use with OFDM symbols known in the art. The derotator 304 removes rotation from the equalized symbols by multiplying the equalized symbols by the previous phase estimate $\hat{\theta}_{n|n-1}$ where index n denotes the OFDM symbol index.

The pilot tone extractor 306 extracts pilot tones from the derotated OFDM symbol. The data tone extractor 308 extracts data tones from the derotated OFDM symbol 322. The extracted pilot tones and/or data tones are provided to the phase estimator 310. The phase estimator 310 estimates the phase difference between the oscillator 316 and the oscillator of the transmitting device 108 based on the extracted pilot/data tones. The estimated phase error is denoted $\hat{\theta}_n - \hat{\theta}_{n|n-1}$.

The estimated phase error is provided to the second order PLL core 314. In the packet based OFDM system 100, the packet header contains information used to decode the data payload. Consequently, any phase error in the header symbols must be corrected quickly to allow the header to be decoded without error. To accelerate the convergence of the PLL 104, the bandwidth controller 312 adjusts the bandwidth of the PLL core 314 from a relatively wide bandwidth value that allows fast convergence to a narrower value providing improved noise rejection. The bandwidth controller 312 adjusts the bandwidth by changing the gains applied to the PLL core 314 in the first few symbols of the received packet. The bandwidth controller 312 adaptively changes the loop filter gain $\alpha_1$ and oscillator gain $\alpha_2$ such that the PLL 104 enters a stable regime with control of the phase error.

Figure 4:
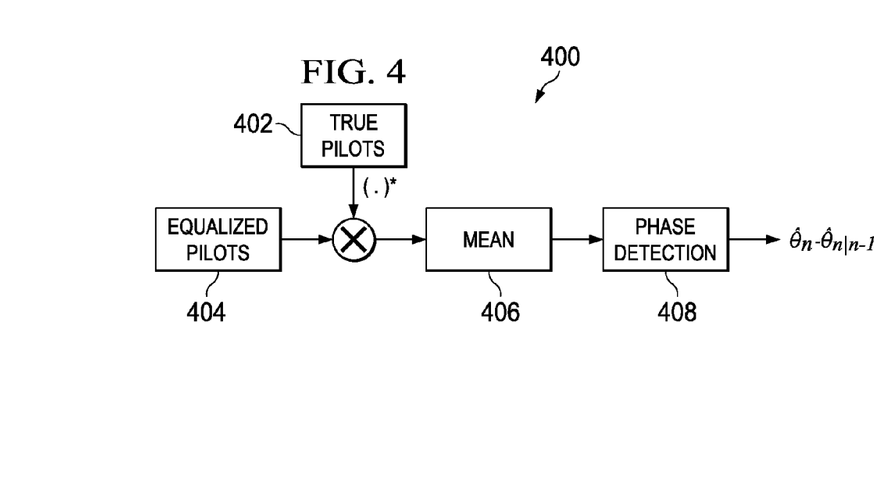
FIG. 4 shows a block diagram of a pilot signal based phase estimator in accordance with various embodiments.

The performance of the phase estimator 310 impacts the overall performance of the PLL 104. FIG. 4 shows a block diagram of a pilot signal based phase estimator 400 in accordance with various embodiments. Embodiments of the phase estimator 400 may be included in the phase estimator 310. The pilot symbols 402 are known to the phase estimator 400. The pilot signal based phase estimator 400 multiplies the equalized and derotated pilot symbols 404 by the conjugate of the known pilot symbols 402. The phase estimator 400 includes a mean computation block 406 and a phase detector 408.

Figure 5A:
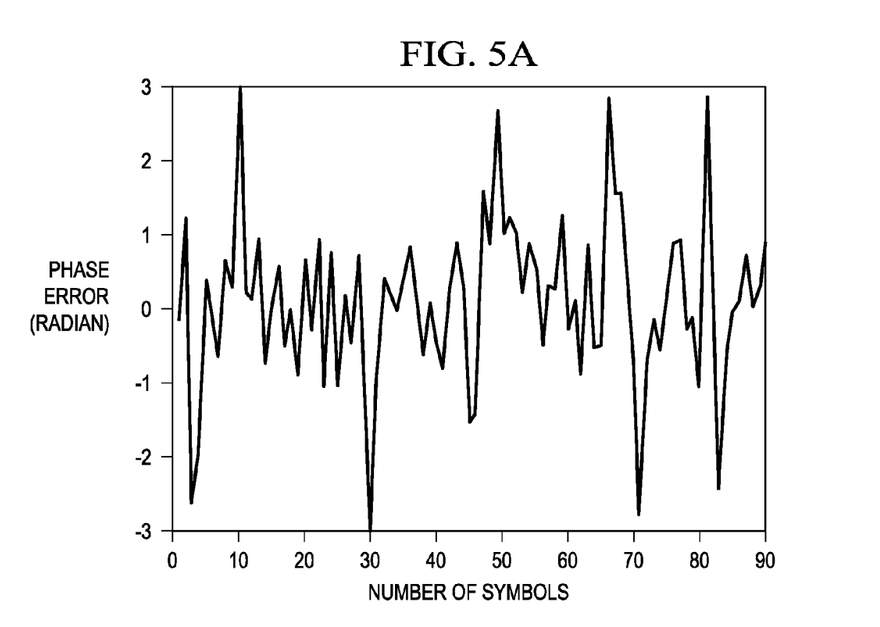
FIGS. 5A and 5B show phase error plots respectively corresponding to phase extraction before and after signal mean computation in accordance with various embodiments.
Figure 5B:
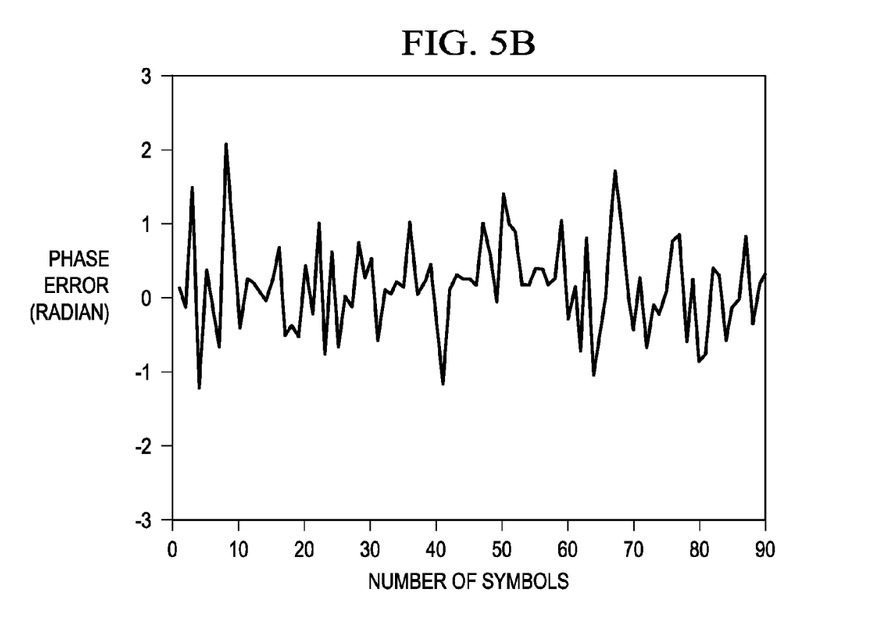

When the noise level is higher than the signal level, the phase of the original signal is sensitive to large phase noise. The phase estimator 400 computes the mean of the pilot signals prior to determining the phase. Computing the mean prior to phase detection provides more accurate phase error estimates that computing the mean after phase detection. FIGS. 5A and 5B show phase error plots corresponding respectively to phase detection before signal mean computation and after signal mean in accordance with various embodiments. The plots assume SNR=−4 dB with 250 Hz carrier frequency offset (with carrier frequency of 982 MHz). Four pilot tones are used to estimate the phase for each OFDM symbol. FIGS. 5A and 5B show that mean computation prior to phase detection, as applied by embodiments of the phase estimators disclosed herein, produces smaller phase errors that computation of mean after phase detection.

Figure 6:
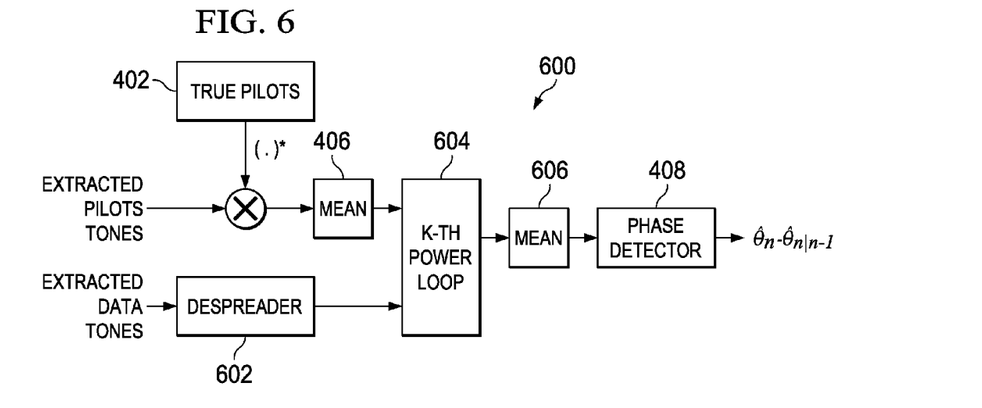
FIG. 6 shows a block diagram for a pilot and data signal based phase estimator in accordance with various embodiments.

FIG. 6 shows a block diagram for a pilot and data signal based phase estimator 600 in accordance with various embodiments. Embodiments of the phase estimator 600 may be included in the phase estimator 310. The phase estimator 600 includes components of the pilot based phase estimator 400, a despreader 602, a power loop 604, and a mean computation block 606. The mean computation block 606 computes the mean of data and/or header signals prior to phase detection by the phase detector 408 for the reasons explained above.

The wireless network 100 may employ frequency domain spreading. The phase estimator 600 provides improved performance by despreading, via the despreader 602, as known in the art, packet header and data payload with a frequency domain spreading factor prior to the power loop 604.

The header of a received OFDM packet may be modulated using one of BPSK and QPSK, and the modulation type is known to the phase estimator 600 a priori. For a BPSK constellation and a QPSK constellation, the power loop 604 implements a 2nd order power-loop and a 4th order power-loop, respectively, to extract the phase offset of the received signal. For example, when there is a phase offset θ in the BPSK constellation, the power loop 604 applies a 2nd order power-loop to extract the phase offset.

Figure 7:
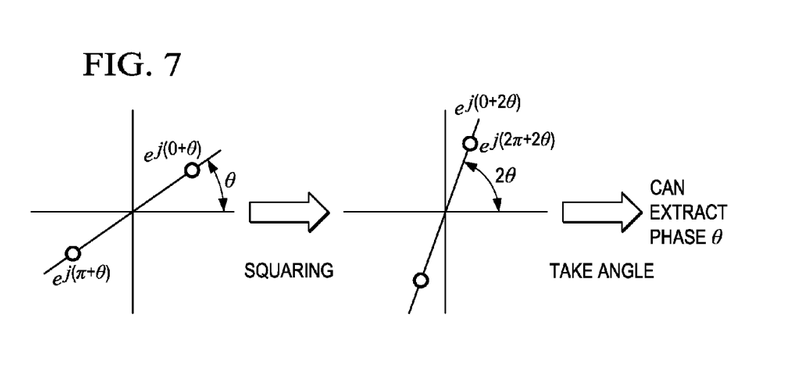
FIG. 7 shows an illustration of phase offset extraction in accordance with various embodiments.

FIG. 7 shows an illustration of phase offset extraction for a BPSK modulated symbol using a 2nd-order power loop in accordance with various embodiments of the power loop 604. The power loop 604 squares the symbol producing an angle of 2θ corresponding to the squared symbol. The power loop 604 divides the angle 2θ by 2 to extract the value of the phase θ of the symbol. The power loop 604 operates similarly for a QPSK modulated symbol. The power loop 604 raises the QPSK symbol to the fourth power producing an angle of 4θ. The power loop 604 divides the angle 4θ by 4 to extract the value of the phase θ of the symbol. For a 16-QAM constellation, the power loop 604 applies a 12th order power-loop (raises to the power 12 and divides by 12) to extract the phase offset of the data payload.

Figure 8:
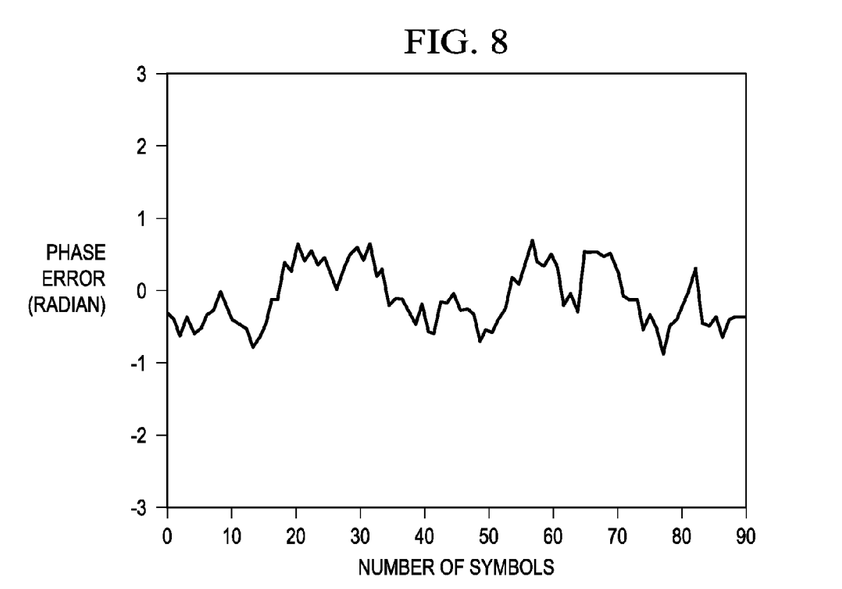
FIG. 8 shows a plot of phase error based on a pilot and data signal based phase estimator in accordance with various embodiments.

FIG. 8 shows a plot of phase error based on the pilot and data signal based phase estimator 600 in accordance with various embodiments. The plot is based on operation with SNR=−4 dB with 250 Hz carrier frequency offset and BPSK modulated header and data with FDS=4 (frequency domain spreading factor of 4). Four tones and 48 tones are used for the pilots and data, respectively. As the plot shows, the phase estimator 600 significantly decreases phase noise relative to the pilot-based estimator 400. A frequency domain spreading factor of 2 (FDS=2) replicates PSK symbols in the positive-numbers data subcarriers and copies them into the negative-numbered data subcarriers with pre-determined phase rotations which reduce the peak-to-average power ratio. A frequency domain spreading factor of 4 (FDS=4) replicates PSK symbols in the lower half of the positive-numbered data tones and copies them to the upper half of the positive-numbered data tones and the lower and upper halves of the negative-numbered data tones, again with pre-determined phase rotations applied to the replicated PSK symbols.

Returning now to FIG. 3, for the second order PLL core 314, loop filter gain $\alpha_1$ and VCO gain $\alpha_2$ can be expressed as:

$$\alpha_1 = \frac{\omega_n^2 T^2}{1 + 2\zeta\omega_n T + \omega_n^2 T^2}, \text{ and}$$

$$\alpha_2 = \frac{2\zeta\omega_n T + \omega_n^2 T^2}{1 + 2\zeta\omega_n T + \omega_n^2 T^2}$$

where:
T denotes the symbol duration,
$\omega_n$ denotes natural frequency which is related to loop bandwidth $f_n$ as $\omega_n = 2\pi f_n$, and
$\zeta$ denotes the damping factor.

Figure 9A:
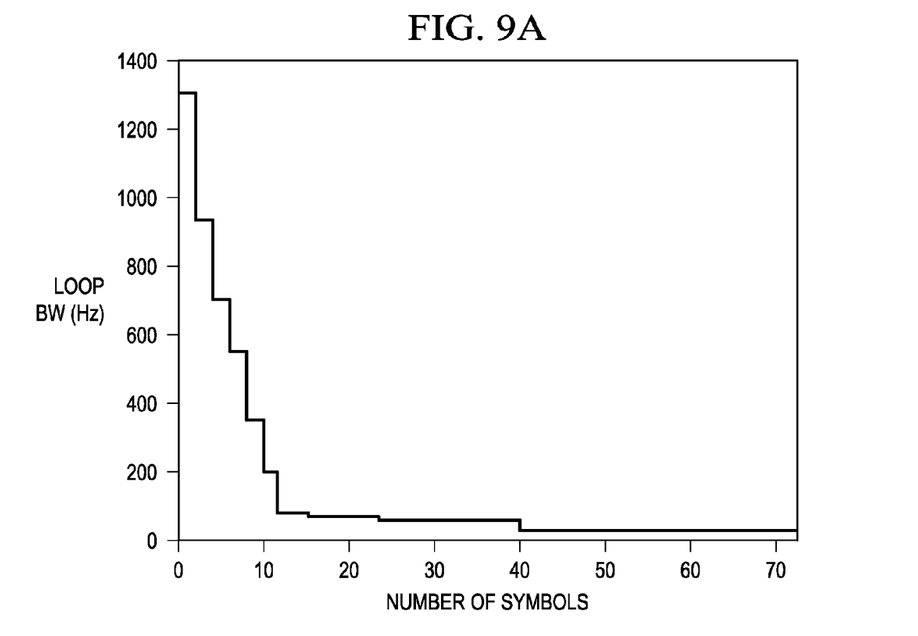
FIGS. 9A and 9B show plots of bandwidth reduction and mean square error of phase noise resulting from the bandwidth reduction in accordance with various embodiments.
Figure 9B:
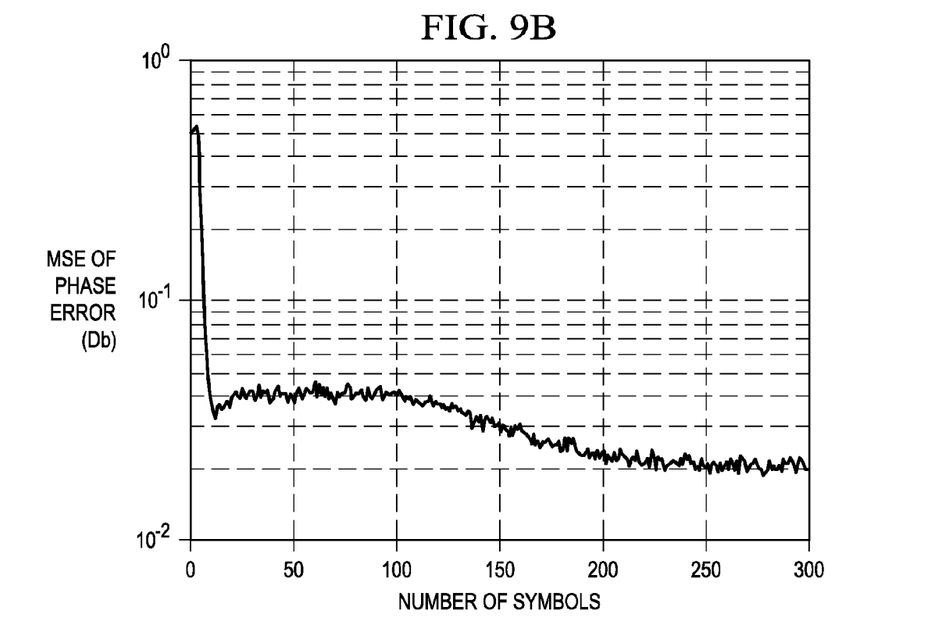

The bandwidth controller 312 adaptively changes loop BW $f_n$ such that the mean squared error (MSE) of the phase noise is minimized. The bandwidth reduction sequence applied by the bandwidth controller 312 and the corresponding MSE are shown in FIGS. 9A and 9B respectively. FIG. 9A shows that the bandwidth controller 312 sets the PLL 104 to have a relatively wide bandwidth at the start of the packet, and substantially narrows the bandwidth within the first few symbols of the packet. The wide initial bandwidth allows the PLL 104 to converge quickly. The narrowed bandwidth reduces phase noise, stabilizing the oscillator 316.

Figure 10:
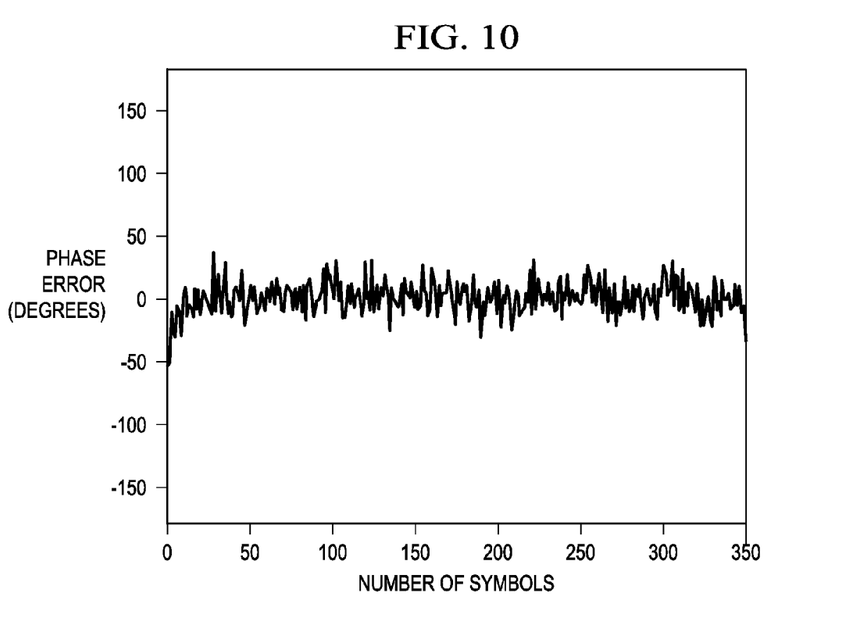
FIG. 10 shows a plot of phase error produced by a PLL in accordance with various embodiments.

FIG. 10 shows a plot of phase error produced by the PLL 104 in accordance with various embodiments. The plot illustrates operation of the PLL 104 in an OFDM system 100 with 64 subcarriers, 4 pilot tones and 48 data tones, and header and data payload modulated using BPSK with FDS=4. A residual carrier frequency offset of 1 part-per-million (with carrier frequency 928 MHz) at SNR=−4 dB in the AWGN channel is assumed. The plot of FIG. 10 shows the ability of the PLL 104 to track residual carrier frequency offset.

Various components of the PLL 104 including at least some portions of the phase estimator 310 and the bandwidth controller 312 can be implemented using a processor in the wireless device 102 executing software programming that causes the processor to perform the operations described herein. In some embodiments, the phase estimator 310 includes a processor executing software programming that causes the processor to despread data signals, perform the power loop computations, and/or compute signal mean as disclosed herein.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

Software programming that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, read-only-memory), or combinations thereof.

Some embodiments can implement portions of the PLL 104, including portions of the phase estimator 310 and the bandwidth controller 312 using dedicated circuitry (e.g., dedicated circuitry implemented in an integrated circuit). Some embodiments may use a combination of dedicated circuitry and a processor executing suitable software. For example, some portions of the phase estimator 310 may be implemented using a processor or hardware circuitry. Selection of a hardware or processor/software implementation of embodiments is a design choice based on a variety of factors, such as cost, time to implement, and the ability to incorporate changed or additional functionality in the future.

Figure 11:
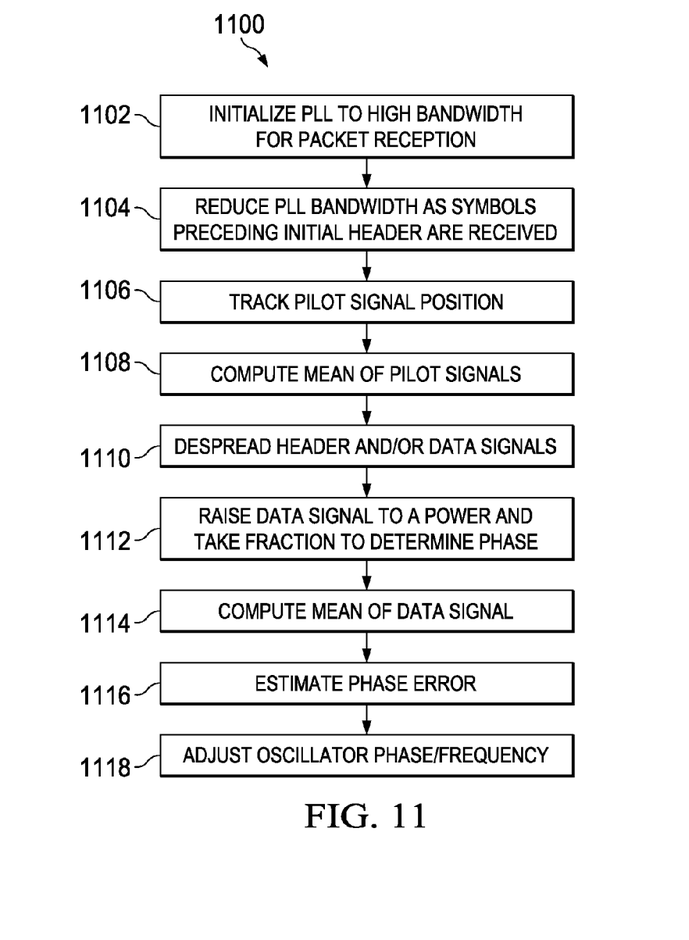
FIG. 11 shows a flow diagram for a method for phase locking to a carrier frequency in accordance with various embodiments.

FIG. 11 shows a flow diagram for a method for phase locking to a carrier frequency in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 1100, as well as other operations described herein, can be performed by a processor executing instructions stored in a computer readable medium.

In block 1102, the PLL bandwidth controller 312 initializes the bandwidth of the PLL 104 to be relatively wide. The wide initial bandwidth allows the PLL 104 to converge quickly based on the initial symbols (e.g., the long/short training field symbols) contained in the packet preamble. Quick convergence allows the PLL 104 to adjust the frequency and/or phase of the oscillator 316 prior to reception of the packet header, which defines data payload decoding parameters.

In block 1104, the PLL bandwidth controller 312 reduces the bandwidth of the PLL 104 as symbols preceding the packet header are received. In some embodiments, the bandwidth of the PLL 104 is narrowed in a plurality of successively narrowing steps. The PLL bandwidth controller 312 may narrow the bandwidth by reducing the gain of the loop filter of the PLL and/or reducing the gain of the oscillator 316.

In block 1106, the PLL 104 determines the location of the pilot tones in the OFDM symbol. The pilot tones may move to different subcarriers with each successive symbol. The PLL 104 equalizes and derotates the received OFDM symbol, and extracts the pilot and/or data signals from the derotated symbol.

In block 1108, the PLL 104 computes the mean of the extracted pilot signals prior to phase detection.

In block 1110, the PLL 104 despreads the extracted header and/or data signals. The PLL 104 despreads the signals in accordance with a frequency domain spreading factor applied at transmission of the packet.

In block 1112, the PLL 104 extracts phase offset from the data and/or header signals. The PLL 104 raises the data/header signal to a power and computes the phase offset as a fraction of the angle of the signal raised to the power. The power and the fraction are selected based on the type of modulation applied to the signal at the transmitting device. For BPSK, QPSK, and 16-QAM modulation types, the power and fraction applied are (2, ½), (4, ¼), and (12, 1/12) respectively.

In block 1114, the PLL 104 computes the mean of the data signal. The PLL 104 estimates the phase error in block 1116, and adjusts the frequency and/or phase of the oscillator 316 to conform to the frequency and/or phase of the carrier frequency of the received packet based on the estimated phase error in block 1118. This can be done by directly controlling the oscillator or by multiplying the incoming samples by frequency correction factors using a complex multiplier.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless receiver, comprising:
a phase-locking loop configured to reduce phase and frequency divergence between the wireless receiver and a transmitter of a packet received by the wireless receiver, the phase-locking loop comprising:
a loop bandwidth controller configured to:
set a bandwidth of the phase-locking loop to a first value for reception of an initial symbol of the packet; and
reduce the bandwidth of the phase-locking loop over a number of symbols following the initial symbol and preceding an initial header of the packet;
wherein the phase-locking loop comprises a phase estimator, the phase estimator comprising:
a mean computation block configured to compute a mean of pilot symbols extracted from the packet; and
a phase detector configured to estimate phase error between an oscillator of the receiver and an oscillator of the transmitter based on the mean of the pilot symbols.

2. A wireless receiver, comprising:
a phase-locking loop configured to reduce phase and frequency divergence between the wireless receiver and a transmitter of a packet received by the wireless receiver, the phase-locking loop comprising:
a loop bandwidth controller configured to:
set a bandwidth of the phase-locking loop to a first value for reception of an initial symbol of the packet; and
reduce the bandwidth of the phase-locking loop over a number of symbols following the initial symbol and preceding an initial header of the packet;

wherein the phase-locking loop comprises a phase estimator, the phase estimator comprising a despreader configured to despread, prior to phase estimation, header and data symbols of the packet in accordance with a frequency domain spreading factor applied at the transmitter.

3. A wireless receiver, comprising:
a phase-locking loop configured to reduce phase and frequency divergence between the wireless receiver and a transmitter of a packet received by the wireless receiver, the phase-locking loop comprising:
  a loop bandwidth controller configured to:
    set a bandwidth of the phase-locking loop to a first value for reception of an initial symbol of the packet; and
    reduce the bandwidth of the phase-locking loop over a number of symbols following the initial symbol and preceding an initial header of the packet;
wherein the phase-locking loop comprises a power loop configured to extract phase offset from a received data symbol of the packet by computing a fraction of the data symbol raised to a power; wherein the fraction and the power are determined based on a type of modulation applied to the data symbol at the transmitter.

4. The wireless receiver of claim 3, wherein the fraction is $\frac{1}{2}$ and the power is 2 based on the type of modulation being binary phase shift keying.

5. The wireless receiver of claim 3, wherein the fraction is $\frac{1}{4}$ and the power is 4 based on the type of modulation being quadrature phase shift keying.

6. The wireless receiver of claim 3, wherein the fraction is $\frac{1}{12}$ and the power is 12 based on the type of modulation being sixteen quadrature amplitude modulation.

7. A wireless receiver, comprising:
a phase-locking loop configured to reduce phase and frequency divergence between the wireless receiver and a transmitter of a packet received by the wireless receiver, the phase-locking loop comprising:
  a loop bandwidth controller configured to:
    set a bandwidth of the phase-locking loop to a first value for reception of an initial symbol of the packet; and
    reduce the bandwidth of the phase-locking loop over a number of symbols following the initial symbol and preceding an initial header of the packet;
wherein the phase-locking loop comprises:
a mean calculator configured to compute a mean of phase offsets extracted from data symbols of the packet; and
a phase detector configured to estimate phase error between an oscillator of the receiver and an oscillator of the transmitter based on the mean of the phase offsets.

8. A method, comprising:
initializing a phase locking loop of a wireless receiver to operate with a first bandwidth for reception of a wirelessly transmitted orthogonal frequency multiplexed packet;
reducing bandwidth of the phase-locking loop from the first bandwidth to a second bandwidth as symbols preceding an initial header of the packet are received;
wherein the first bandwidth provides fast carrier acquisition, and the second bandwidth provides lower phase noise than the first bandwidth;
computing a mean of pilot symbols extracted from the packet; and
estimating a phase error between an oscillator of the wireless receiver and an oscillator of a transmitter based on the mean of the pilot symbols.

9. The method of claim 8, further comprising despreading, prior to phase estimation, header and data symbols of the packet in accordance with a frequency domain spreading factor applied at transmission of the packet.

10. A method, comprising:
initializing a phase locking loop of a wireless receiver to operate with a first bandwidth for reception of a wirelessly transmitted orthogonal frequency multiplexed packet;
reducing bandwidth of the phase-locking loop from the first bandwidth to a second bandwidth as symbols preceding an initial header of the packet are received;
wherein the first bandwidth provides fast carrier acquisition, and the second bandwidth provides lower phase noise than the first bandwidth;
determining a type of modulation applied at transmission of the packet;
raising, to a power, a data symbol extracted from the packet;
extracting a phase offset from the data symbol by computing a fraction of the data symbol raised to the power;
wherein the power and the fraction are based on the type of modulation.

11. The method of claim 10, wherein:
the power is 2 and the fraction is $\frac{1}{2}$ based on the modulation type being binary phase shift keying;
the power is 4 and the fraction is $\frac{1}{4}$ based on the modulation type being quadrature phase shift keying; and
the power is 12 and the fraction is $\frac{1}{12}$ based on the modulation type being sixteen quadrature amplitude modulation.

12. A method, comprising:
initializing a phase locking loop of a wireless receiver to operate with a first bandwidth for reception of a wirelessly transmitted orthogonal frequency multiplexed packet;
reducing bandwidth of the phase-locking loop from the first bandwidth to a second bandwidth as symbols preceding an initial header of the packet are received;
wherein the first bandwidth provides fast carrier acquisition, and the second bandwidth provides lower phase noise than the first bandwidth;
computing a mean of phase offsets extracted from data symbols of the packet; and
estimating phase error between an oscillator of the receiver and an oscillator of a transmitter based on the mean of the phase offsets.

13. A system, comprising:
a first wireless device configured to receive a wirelessly transmitted orthogonal frequency division multiplexed packet with frequency domain spreading, the first wireless device comprising:
  a phase-locking loop configured to lock the first wireless device to a carrier frequency of the packet, the phase-locking loop comprising:
    a despreader configured to despread, prior to phase estimation, header and data symbols of the packet in accordance with a frequency domain spreading factor applied to the packet at transmission; and
    a power loop coupled to an output of the despreader, the power loop configured to extract phase offset from a despread data symbol by computing a fraction of the data symbol raised to a power; wherein the fraction and the power are determined based on a type of modulation applied to the packet at transmission.

14. The system of claim 13, wherein:
the power is 2 and the fraction is ½ based on the type of modulation being binary phase shift keying;
the power is 4 and the fraction is ¼ based on the type of modulation being quadrature phase shift keying; and
the power is 12 and the fraction is 1/12 based on the type of modulation being sixteen quadrature amplitude modulation.

15. The system of claim 13, wherein the phase-locking loop further comprises a loop bandwidth controller configured to:
set a bandwidth of the phase-locking loop to a first value for reception of an initial symbol of the packet; and
narrow the bandwidth of the phase-locking loop over a number of symbols preceding an initial header of the packet.

16. The system of claim 15, wherein the loop bandwidth controller is configured to reduce the bandwidth of the phase-locking loop by reducing gain of at least one of a loop filter and an oscillator of the phase-locking loop over a predetermined number of initial symbols of the packet.

17. The system of claim 13, wherein the phase-locking loop further comprises:
a mean calculator configured to compute a mean of at least one of data, header, and pilot symbols extracted from the packet; and
a phase detector configured to estimate phase error between an oscillator of a receiver of the first wireless device and an oscillator of a transmitter of the first wireless device based on the mean.

18. The system of claim 13, further comprising one or more additional wireless devices configured to receive a wirelessly transmitted orthogonal frequency multiplexed packet with frequency domain spreading.

19. The system of claim 18, wherein the wireless devices are smart utility meters, and the system is a smart metering network.

* * * * *